(12) United States Patent
Pindiprolu et al.

(10) Patent No.: US 11,820,937 B2
(45) Date of Patent: Nov. 21, 2023

(54) CONTRIBUTION BASED APPROACH TO INCREASE THE DENSITY AND STRENGTH OF CURRENT THIXOTROPIC LOSS CONTROL SOLUTIONS

(71) Applicant: Halliburton Energy Services, Inc., Houston, TX (US)

(72) Inventors: Sairam K S Pindiprolu, Pune (IN); Sudhir Maruti Nimane, Pune (IN); Sandip Prabhakar Patil, Pune (IN); Rahul Chandrakant Patil, Pune (IN)

(73) Assignee: Halliburton Energy Services, Inc., Houston, TX (US)

( * ) Notice: Subject to any disclaimer, the term of this patent is extended or adjusted under 35 U.S.C. 154(b) by 619 days.

(21) Appl. No.: 16/772,006

(22) PCT Filed: Jul. 29, 2019

(86) PCT No.: PCT/US2019/043891
§ 371 (c)(1),
(2) Date: Jun. 11, 2020

(87) PCT Pub. No.: WO2021/021101
PCT Pub. Date: Feb. 4, 2021

(65) Prior Publication Data
US 2021/0403793 A1 Dec. 30, 2021

(51) Int. Cl.
*C09K 8/504* (2006.01)
*C09K 8/50* (2006.01)
*C09K 8/508* (2006.01)
*C09K 8/514* (2006.01)

(52) U.S. Cl.
CPC .............. *C09K 8/5045* (2013.01); *C09K 8/50* (2013.01); *C09K 8/508* (2013.01); *C09K 8/5083* (2013.01); *C09K 8/514* (2013.01)

(58) Field of Classification Search
None
See application file for complete search history.

(56) References Cited

U.S. PATENT DOCUMENTS

| | | | |
|---|---|---|---|
| 5,389,706 A * | 2/1995 | Heathman | C04B 28/04 524/157 |
| 8,685,903 B2 | 4/2014 | Ravi et al. | |
| 9,346,711 B2 | 5/2016 | Chatterji et al. | |
| 2003/0000423 A1* | 1/2003 | Vijn | C04B 7/527 106/676 |
| 2003/0008779 A1* | 1/2003 | Chen | C09K 8/5083 507/200 |
| 2010/0044043 A1* | 2/2010 | Roddy | C09K 8/473 166/294 |
| 2013/0153214 A1* | 6/2013 | Roddy | C09K 8/03 507/276 |
| 2013/0231416 A1 | 9/2013 | Chatterji et al. | |

(Continued)

OTHER PUBLICATIONS

International Search Report and Written Opinion issued in PCT Application No. PCT/US2019/043891 dated Apr. 28, 2020.

*Primary Examiner* — John J Figueroa
(74) *Attorney, Agent, or Firm* — McAfee & Taft

(57) ABSTRACT

The current method comprises producing a loss control blend by selecting blend ingredients that contribute to thixotropy of the blend, density of the blend, and compressive strength of the set blend, wherein at least one of the blend ingredients contributes positively to all three of these attributes.

20 Claims, 4 Drawing Sheets

(56) References Cited

U.S. PATENT DOCUMENTS

2016/0017688 A1* 1/2016 Chatterji ................ C04B 28/02
                                                         264/299
2016/0068733 A1   3/2016 Jamison et al.
2016/0160109 A1   6/2016 Patil et al.
2018/0037795 A1   2/2018 Goel et al.

* cited by examiner

CONTRIBUTION BASED APPROACH TO INCREASE THE DENSITY AND STRENGTH OF CURRENT THIXOTROPIC LOSS CONTROL SOLUTIONS

FIELD

The present disclosure relates generally to downhole operations for subterranean formations, more specifically in certain embodiments, to the selection and introduction of compositions into a wellbore for loss control applications.

BACKGROUND

A natural resource such as oil or gas residing in a subterranean formation can be recovered by drilling a wellbore into the formation. A wellbore is typically drilled while circulating a drilling fluid through the wellbore. Among other things, the circulating drilling fluid may lubricate the drill bit, carry drill cuttings to the surface, and balance the formation pressure exerted on the wellbore. One problem associated with drilling may be the undesirable loss of drilling fluid to the formation. Such lost fluids typically may go into, for example, fractures induced by excessive mud pressures, into pre-existing open fractures, or into large openings with structural strength in the formation. This problem may be referred to as "lost circulation," and the sections of the formation into which the drilling fluid may be lost may be referred to as "lost circulation zones." The loss of drilling fluid into the formation is undesirable, inter alia, because of the expense associated with the drilling fluid lost into the formation, loss of time, additional casing strings and, in extreme conditions, well abandonment. In addition to drilling fluids, problems with lost circulation may also be encountered with other fluids, for example, spacer fluids, completion fluids (e.g., completion brines), fracturing fluids, and cement compositions that may be introduced into a wellbore.

One method that has been developed to control lost circulation involves the placement of lost circulation materials into the lost circulation zone. Conventional lost circulation materials may include fibrous, lamellated or granular materials. The lost circulation materials may be placed into the formation, inter alia, as part of a drilling fluid or as a separate lost circulation pill in an attempt to control and/or prevent lost circulation. For a number of reasons, use of lost circulation materials may not provide a desirable level of lost circulation control in all circumstances.

Another method that has been developed to control lost circulation involves the placement of a settable composition into the wellbore to seal the lost circulation zone. To be effective, the settable composition should ideally exhibit good thixotropy, that is, maintain a low viscosity while under shear, but, when allowed to remain static, the composition should develop gel strength quickly with the ability to thin and flow when shear is re-applied. Additionally, the settable composition should rapidly develop compressive strength after placement into the lost circulation zone. Finally, the settable composition should also have a suitable density for the environment downhole. Unfortunately, past settable compositions have not been able to achieve all three of these. For example, given a suitable density, the settable systems might have exhibited either good thixotropy or good compressive strength but, if so, not both.

BRIEF DESCRIPTION OF THE DRAWINGS

The drawings included with this application illustrate certain aspects of the embodiments described herein. However, the drawings should not be viewed as exclusive embodiments. The subject matter disclosed herein is capable of considerable modifications, alterations, combinations, and equivalents in form and function, as will be evident to those skilled in the art with the benefit of this disclosure.

DETAILED DESCRIPTION

Figure 1:
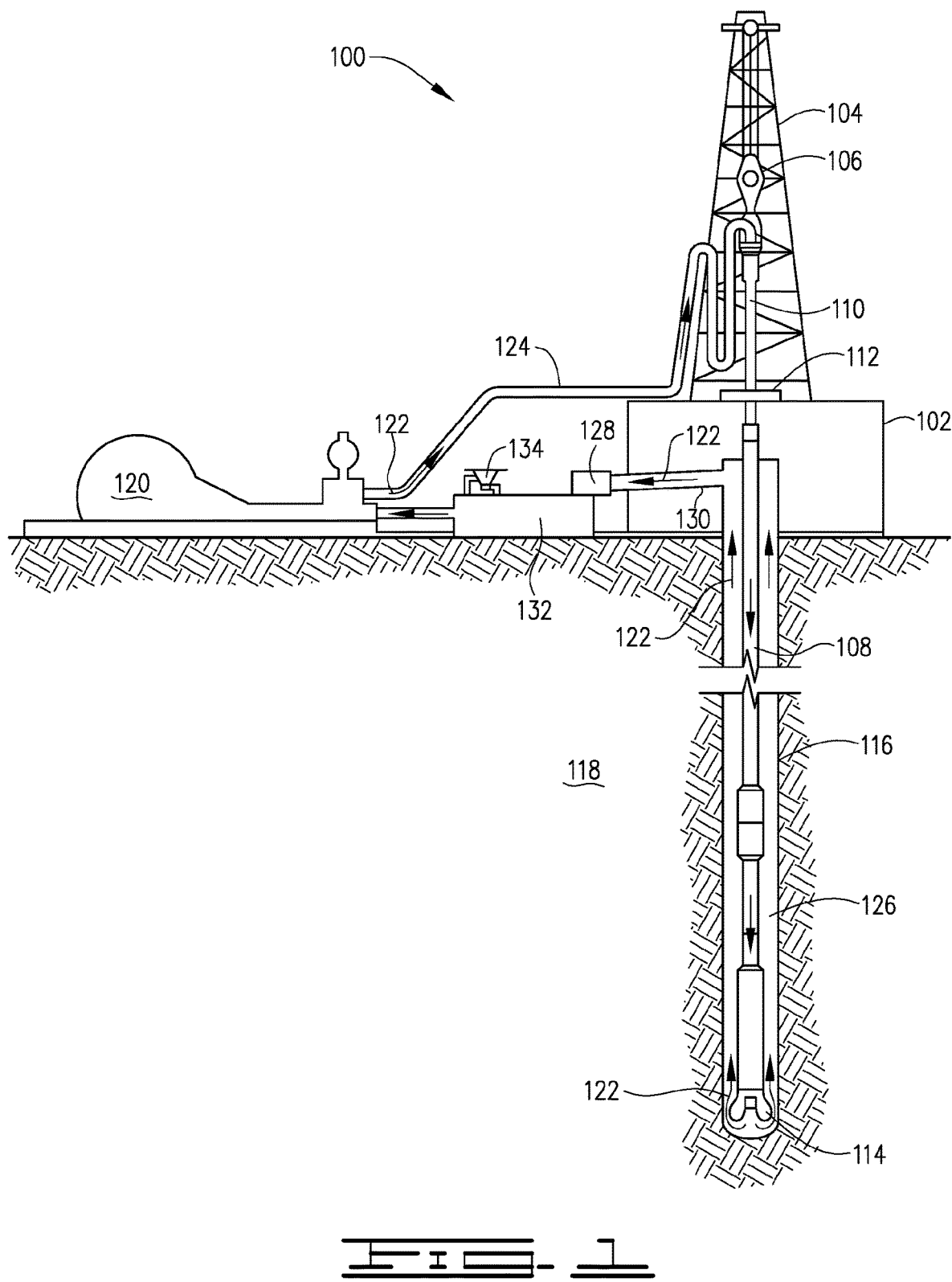
FIG. 1 depicts a land-based drilling assembly where blends designed in accordance with the current methods can be used.

The present disclosure may be understood more readily by reference to this detailed description. Numerous specific details are set forth in order to provide a thorough understanding of the embodiments described herein. However, it will be understood by those of ordinary skill in the art that the embodiments described herein can be practiced without these specific details. The description is not to be considered as limiting the scope of the embodiments described herein.

The present disclosure relates to servicing a wellbore and, in certain embodiments, to the introduction of compositions into a wellbore to reduce the loss of fluid into the formation. There may be several potential advantages to the methods and compositions of the present disclosure, only some of which may be alluded to herein. One of the many potential advantages of the methods of the present disclosure is that it provides for a systematic method of producing a loss control blend designed to have desired attributes including compressive strength, thixotropic behavior and density.

Broadly, the current method comprises producing a loss control blend by selecting blend ingredients that contribute to thixotropy of the blend, density of the blend, and compressive strength of the set blend, wherein at least one of the blend ingredients contributes positively to all three of these attributes. "Contributes to" or contributes positively" refers to an increase in the property; thus, "contributing to thixotropy" means increasing the thixotropic behavior, "contributing to density" means increasing the density, and "contributing to compressive strength" means increasing compressive strength.

The ingredients are selected to include a combination of passive components, which can be passive weighting agents and/or strength retrogression additives to build up density—at least one of which participates in the strength buildup by chemically coalescing with the reactive materials (active components). Accordingly, the resulting loss control blend is an admixture of active components and passive components. "Active components" or "active material" as used herein are components, that in the absence of a retarder, change their state, form, surface properties, or chemical composition immediately (e.g., less than 1 hour) upon being combined with water; that is, they have an immediate reaction and/or have high surface activity when combined with water without the need for heating of higher magnitude than is present at the surface and placement zone of interest, for example, hydraulic cement. In some uses, a retarder may be used to inhibit the behavior of active components; however, generally such retarders have negatively contributed to (or decreased) thixotropic behavior, density or compressive strength. "Passive component" or "passive material" as used herein are materials that are either inert or those that need temperature and time (e.g., greater than 1 hour) to activate with much higher magnitude than required for surface delivery and placement in the zone of interest to change form and chemically coalesce with the other materials, for example, sand or fused silica.

Where a passive component is a solid, it generally is selected such that the particle size distribution of the same and total surface area of the particles are favorable for or even optimal to remain in suspension in the reactive-reversible gel. Finally, the passive components are also generally selected such that their aggregate specific gravity derives a desired volumetric ratio to keep a solids/water ratio of the blend to the minimum for retaining thixotropic behavior.

As will be apparent from the above, the loss control blend developed by the methods of this disclosure will be a multi-component aggregated mixture when mixed with water, and may include retarders, a fluid loss control additive, a clay, a polymer suspending aid, and similar. In some cases, a combination of clay and/or polymer can be selected to be included in the blend. The combination is minimalistically tailored to retain suspension properties at elevated temperatures—such as found downhole—and offset any incidental thermal thinning which could counter thixotropic behavior. Overall, the combination of components developed under the method make a pumpable thixotropic high-density slurry that will be capable of addressing lost circulation.

"Thixotropic properties" or "thixotropy" refers a composition being shear sensitive so that the composition remains pumpable for sufficient time for placement, but when static, the composition develops a gel strength in a short period of time followed by rapid compressive strength development. A composition with thixotropic behavior develops gel strength when shear is removed, but thins when the shear is re-applied. For use downhole, the thixotropic properties are preferably not overly dependent on the temperature of the well. Further, the composition should develop sufficient static gel strength in a short-time frame to be effective at lost circulation control. Hydraulic cements, as mentioned above, generally do not have thixotropic behavior; that is, hydraulic cements generally do not thin under shear and develop gel strength when shearing is removed.

Those skilled in the art will realize that "gel strength" is different from "setting" of the composition. "Gel strength"—especially for thixotropic fluids—refers to an increase in viscosity as the fluid remains quiescent for a certain period of time. While a thixotropic fluid will increase viscosity during quiescent, it thins again during shearing or dynamic periods. Thus, the composition during certain quiescent periods develops gel strength but remains pumpable because of the thinning that occurs during dynamic periods. However, for longer quiescent periods, the composition sets and becomes unpumpable. "Setting" or a composition that has "set" means the composition no longer has the property of being able to thin under shear. Typically, the set composition develops a higher compressive strength and changes to a solid state.

The loss control blends developed by the current methods generally develop a rapid gel strength every time there is a short shutdown in operations (shearing) and regain pumpability (thins down) when operations (shearing) is continued. The short down time is a tailored threshold time—that is a predetermined time threshold—that is typically determined by well and formation conditions. This predetermined time threshold typically will be the planned mixing time plus the placement time (placement time for introducing the loss control blend to a predetermined location in the wellbore), plus a general safety factor—a time overage due to shutdowns, usually 20% or less, or 10% or less of the total mixing time plus placement time. Setting of the loss control blend does not occur any time before this predetermined time threshold has past, even in the case of multiple shutdowns.

Shutdowns generally represent situations where there is a planned or an unplanned removal of shear from the pumps during the placement operation, or where the loss circulation control blend enters a large pathway in the formation where the shear rate of the fluid is significantly lower (such as a couple of orders magnitude lower) than during pumping. For example, planned shutdowns can include pulling out a string of pipe from the wellbore, dropping a ball plug, setting a tool, etc. For example, unplanned shutdowns can include equipment failures and the like. When gel strength builds up in such low shear situations in the formation-crevice, the fluid becomes an immobile block and prevents further leak off. The predetermined time threshold is selected such that gel strength development in the loss control blend during such shutdowns are reversible; therefore, when pumping resumes, it becomes thin. However, when the predetermined time threshold is exceeded without shearing occurring, the loss control blend will set so that it no longer thins under shear thus will not move.

For example, thixotropic loss-control compositions may be characterized by a 10-second static gel strength of at least about 10 lbf/100 ft$^2$ at room temperature (e.g., about 78° F.). By way of further example, thixotropic loss-control compositions may be characterized by a 10-minute static gel strength of at least about 20 lbf/100 ft$^2$ at room temperature. In addition to static gel strength, thixotropic loss-control compositions should remain pumpable for an extended period of time. A fluid is considered to be in a pumpable fluid state where the fluid has a consistency of less than 70 Bc (Bearden units), as measured using a pressurized oilfield cement consistometer as described in API RP 10B2 under pressure and temperatures similar to those in the subterranean wellbore. Thixotropic loss-control compositions should remain pumpable for the predetermined time threshold described above. Typically, this will be less than 1 day; more typically, this will be up to about 16 hours, but can be up to about 8 hours or up to 2 hours. As long as, the loss control blend is not stagnant for more than the predetermined time threshold, such thixotropic behavior will be continued and the blend will remain pumpable at elevated temperatures, for example, as high as 450° F.; thus, thixotropic loss-control compositions can have a consistency of less than 70 Bc, or 35 Bc or less, at a temperature up to about 450° F. at 150 rpm. When the shear is removed, the composition should gel and, on the other hand, the composition should thin when re-sheared. As a further example, thixotropic loss-control compositions develops consistency of greater than 70 Bc when the stirring is stopped in a consistometer at temperatures up to 450° F. However, the composition thins to a consistency of less than about 35 Bc when the stirring is resumed at 150 rpm. In addition, the composition should develop gel strength rapidly when left static in certain embodiments. Gel strength development should be followed, for example, by rapid development of compressive strength when left static for a longer time, i.e. when the composition "sets" after the predetermined time threshold.

As will be appreciated from the above, "set compressive strength" refers to the compressive strength of the composition after it has been allowed to set and, hence, no longer has the property of being able to thin under shear.

Control or selection of density of the loss control blend is important for designing a loss control blend. Those of ordinary skill in the art will appreciate that loss control blends should generally have a density suitable for a particular application. Densities of hydraulic cement pills that are used for loss circulation control applications are generally about 12 pounds per gallon ("ppg") to 20 ppg. However, the higher densities resulted in a loss of thixotropic activity; thus, some prior thixotropic loss control compositions were limited to densities in the range of from about 6 ppg to about 14 ppg. However, such compositions have been inadequate to deal with applications requiring densities of more than 14 ppg. The methods of the current disclosure can result in loss control blends that retain thixotropic behavior and have densities in the range of from about 6 ppg to about 20 ppg or above, or in the range of from about 8 ppg to about 19 ppg. Uniquely, the method can result in loss control blends having densities above 14 ppg, such as in the range of 14 ppg to 20 ppg, and alternatively, 15 ppg to about 19 ppg and yet retain thixotropic behavior.

In more specific embodiments, the method of producing a loss control blend includes determining a first density, a first compressive strength and a first thixotropic behavior of a first composition consisting essentially of a blend of active components—including a hydraulic cement and other active components—and water. Typically, the blend of active components will be present in an amount from about 50 wt % to about 95 wt % based on the total first composition, or from about 55 wt % to about 90 wt %, or from about 60 wt % to about 80 wt %. While hydraulic cement has been used for loss control because of its good set compressive strength, it has drawbacks. For example, open-hole cement plugs at high density are common but they fail in loss circulation situations because they lack thixotropic behavior. Additionally, low-density cement plugs have been mixed and pumped with thixotropic attributes; however, they lose thixotropy as their density is increased. This disclosure provides for methods of designing loss control blends by utilizing the hydraulic cement along with specifically selected additives to produce a loss control blend having required thixotropic, set compressive strength and density properties.

The active components should, for example, provide bonding of the lost circulation composition to the formation in addition to compressive strength. The active components typically include a hydraulic cement and can, alternatively or in addition to the hydraulic cement, further include other active components such as, for example, cement kiln dust, lime kiln dust, hydrated lime, zeolites, pumice, perlite, furnace slag, fly ash, natural pozzolan and/or amorphous silica sources (like silica fume, diatomaceous earth, etc.) as well as combinations thereof. Any of a variety of hydraulic cements suitable for use in subterranean operations may be used in accordance with embodiments of the present disclosure. Suitable examples include hydraulic cements that comprise calcium, aluminum, silicon, oxygen and/or sulfur, which set and harden by reaction with water. Such hydraulic cements, include, but are not limited to, Portland cements, pozzolana cements, gypsum cements, high-alumina-content cements, slag cements, and combinations thereof. In certain embodiments, the hydraulic cement may comprise a Portland cement. Portland cements that may be suited for use in embodiments of the present disclosure may be classified as Class A, C, H and G cements according to American Petroleum Institute, API Specification for Materials and Testing for Well Cements, API Specification 10, Fifth Ed., Jul. 1, 1990. In addition, in some embodiments, hydraulic cements suitable for use in the present disclosure may be classified as ASTM Type I, II, or III.

As will be realized, the first composition consists essentially of a blend of active components and water so as to provide a baseline for the properties adjusted by the additives selected in the current method. Accordingly, the first composition is comprised of a blend of active components in a slurry without any passive component additives that might change its thixotropic, set compressive strength and density properties.

Once the properties of the active component slurry (i.e., the first composition) is determined, the next step is selecting ingredients for a loss control blend having a second density, a second set compressive strength and a second thixotropic behavior. The loss control blend comprises the active component blend for which the properties of active component slurry were determined, a clay, a polymer and at least two or more additional components, which can be passive components or additional active components.

The hydraulic cement may be present in the loss-control blend in an amount, for example, of about 0.1% to about 50% by weight of the blend. In some embodiments, the hydraulic cement may be present in an amount of about 10% to about 20% by weight of the blend. In some embodiments, the hydraulic cement may be present in an amount of about 13% to about 20% by weight of the blend. One of ordinary skill in the art, with the benefit of this disclosure, will recognize the appropriate amount of the hydraulic cement to include for a chosen application based on the limitations below for the other components.

Clay and/or polymer can be added to, among other things, increase the thixotropic behavior of the blend over the cement slurry alone. Generally, the clay can be selected from natural and synthetic clays. For example, the clay can be hectorite, bentonite, sepiolite, kaolinite, montmorillonite, talc, vermiculite, halloysite, brucite, muscovite, smectite, chlorite and mixtures thereof. The clay can be present in an amount from 0.05 wt % to 5.0 wt % based on the total weight of the loss control blend.

Generally, the polymer can be selected so as to enhance gelling and suspension of particles. For example, the polymer can be borate crosslinked HEC, xanthan gum, welan gum, guar, guar gum, HPG, CMHPG, cellulose and its derivatives, CMC, HEC, Diutan, synthetic polymers like polyacrylamide, AMPS, and combinations thereof. The polymer can be present in an amount from 0.05 wt % to 3.0 wt % based on the total weight of the loss control blend.

Generally, the clay and/or polymer are selected for properties and amounts that will retain suspension properties at elevated temperatures and offset any incidental thermal thinning. The clay and/or polymer can act in conjunction with the passive materials that aid in suspension, as described below. Often the clay and/or polymer are selected such that in static conditions, when the blend is cured or set in a 5 inch length by 2 inch diameter sample ("BP Settling Test") the top to bottom difference in specific gravity should be no more than 0.5 ppg.

The BP Settling Test was developed by BP International Ltd as a means to perform relative measurements of cement formulation stability at elevated temperatures and pressures. Generally, in the BP Settling Test the cement slurry is allowed to set hard, permitting free water, unconsolidated solids, and the density profile of the set solids to be distinguished and measured. Specifically, a cement slurry is prepared and heated to the Bottom Hole Circulating Temperature (BHCT) in a pressurized consistometer. The BHCT represents the temperature of a circulating fluid at the bottom of the wellbore after several hours of circulation. The slurry is then cooled and transferred into a settling tube where it is allowed to cure at BHCT. The stability of the slurry is determined once the cement has set. First, the height of the set column of cement is measured and compared with the original height to determine the amount of free water and unconsolidated solids that result from slurry segregation. Next, the settling tube is broken and the cement column is cut into different sections. The density along the cement column is then measured by measuring the bulk volume of each section using the Archimedes Principle.

Each component of the two or more components is selected so as to enhance one of three attributes: increase the thixotropic behavior of the blend, increase the density of the blend and/or increase set compressive strength of the blend. In addition to these attributes, the two or more components can also be selected based on the component enhancing the blends ability to maintain particles in suspension and/or the component being comprised of particles that can be suspended in the blend.

In certain embodiments, each component of the two or more components are selected to contribute to at least one of the three attributes and at least one of the components is selected to contribute to all three tailored attributes. Thus, each component is selected to meet one or more of the following criteria:

1) including the component increases thixotropic behavior such that the loss control blend has increased thixotropic behavior over the first composition (the hydraulic cement slurry);
2) including the component increases density in the loss control blend such that the second density is greater than the first density (the density of the hydraulic cement slurry); and
3) including the component increases set compressive strength in the loss control blend such that the second set compressive strength is greater than the first set compressive strength (the set compressive strength of the hydraulic cement slurry).

The components contributing to the tailored attributes can be active components or passive materials and can include clays, polymers, strength-retrogression additives, mechanical property enhancing additives, thixotropic additives, retarders, accelerators, fluid-loss control additives, expansion agents, gas-migration control agents, etc. Specific examples of these and other additives include silicas (such as crystalline silica, amorphous silica, fused silica and fumed silica), kiln dust, hydrated lime, lime kiln dust, furnace slag, pumice fibers (in ground or fibrous form), calcium carbonates, calcined shale, vitrified shale, iron oxides, fly ash, diatomaceous earth, metakaolin, rice husk ash, natural pozzolan, zeolite, graphites, carbonaceous powders and fibers, glass fibers, rubber derivatives, other mined ground minerals, combinations thereof, and the like.

Many of the components (particularly the passive materials) will contribute to at least two of the tailored attributes. For example, depending on its form and particle size, silica can contribute to set compressive strength and either density or thixotropic behavior. For example, silica in the form of amorphous microfine silica and fumed silica (both active components) will typically contribute to set compressive strength and thixotropic behavior, and silica flour (a passive component, 99.5 wt % or more $SiO_2$ with a particle size of from 10 µm to 100 µm) will typically contribute to set compressive strength and density. Some of the components contribute to all three tailored attributes, such as furnace slag, pumice and rice husk ash. As will be realized from the above, the components will typically include a plurality of passive and active materials consisting of solid particles.

Further, such passive materials are selected so as to have a particle size distribution for the plurality of weighting agents and total surface area for the plurality of passive materials, which are sufficient for the passive materials to remain in suspension in the loss control blend without turbulence for a period of time sufficient to allow the loss control blend to set, that is for a time greater than the predetermined time threshold. More specifically, the particles size distribution and total surface area is sufficient for the passive materials to remain in suspension in the loss control blend without shearing or circulation at a temperature between 32° F. and 450° F. for a period of time sufficient to allow the loss control blend to set. For example, the particle size distribution of the plurality of passive materials can be such that the size of the particles is from 1 µm to 100 µm. Additionally, the specific gravity of the weighting agents can be from 2.2 to 5.2.

Additionally, the loss control blend with water will typically be a slurry having a solids to water ratio by weight basis of 2 to 12, and the active and passive materials are selected so that the loss control blend does not have less thixotropic behavior than the first composition (the cement slurry). Further, loss control blend will generally be combined with water to produce the slurry (or second composition) in amounts similar, or about equal, to the amounts used to produce the first composition but it is within the scope of this invention for the amounts to differ. However, the loss control blend typically will be present in an amount from about 50 wt % to about 95 wt % based on the total second composition (loss control blend and water), or from about 55 wt % to about 90 wt %, or from about 60 wt % to about 80 wt %.

Typically, the passive materials include passive materials such as carbonates, metal oxides, silicon dioxide, granite, barite, ilmenite, rutile, other heavy minerals having a specific gravity of more than 2.4, and combinations in small particulate form. For example, the passive materials can be selected from the group consisting of $CaCo_3$, $CaMg(Co_3)_2$, $MnO_2$, $Fe_2O_3$, $SiO_2$, $BaSO_4$, and combinations thereof. Typically, the total amount of passive materials are present in an amount of up to 80 wt % and can be from 40 wt % to 80 wt % based on the total weight of the loss control blend.

Additionally, passive materials contributing to at least two of the three tailored attributes will be part of the total amount of inter materials, and are typically present in an amount from 55 wt % to 75 wt % based on the total weight of the loss control blend. Also, an active material will typically be the component that contributes to all three of the tailored attributes, and the amount of active materials contributing to all three tailored attributes often represents about 15% to about 30% of the total amount of active material, or can be about a quarter of the total amount of active materials; although, they can be more or less of a quarter of the total.

Some of the active and passive materials can serve chemically coalescing agents so as to enable the blend to better suspend particles. For example, crystalline silica and fumed silica can act as chemically coalescing agents. For example, the fumed silica used generally has a particle size of less than 1 µm and rapidly hydrates to form a polysiloxo gel network, which makes it an efficient suspender. Such agents can be present in amounts from 5 wt % to 40 wt % based on the total weight of the loss control blend, and hence can be about half the total active and passive materials, but can be more or less than half.

Additives other than the above components can be used; however, they should be selected so as not to adversely affect the three tailored attributes or suspension properties of the loss control blend. Further, they can be selected so as not to contribute directly to the three tailored attributes or suspension properties. For example, such additives can be set retarders, set accelerators, fluid loss and control additive. An example of a suitable fluid loss control additive is HALAD® 344 fluid loss additive, available from Halliburton Energy Services, Inc.

The method described above can be used in conjunction with servicing a wellbore. The method is used to configure a loss control blend for the conditions in a wellbore and then introduced into the wellbore. The loss control blend can be used for drilling and completion operations. For example, and with reference to FIG. 1, the method can be used to develop a loss control blend to be used to prevent loss of drilling fluid into a formation during drilling operations. FIG. 1 generally depicts a land-based drilling assembly.

As illustrated, the drilling assembly 100 may include a drilling platform 102 that supports a derrick 104 having a traveling block 106 for raising and lowering a drill string 108. The drill string 108 may include, but is not limited to, drill pipe and coiled tubing, as generally known to those skilled in the art. A kelly 110 supports the drill string 108 as it is lowered through a rotary table 112. A drill bit 114 is attached to the distal end of the drill string 108 and is driven either by a downhole motor and/or via rotation of the drill string 108 from the well surface. As the drill bit 114 rotates, it creates a borehole 116 that penetrates various subterranean formations 118.

A pump 120 (e.g., a mud pump) circulates a drilling fluid 122 through a feed pipe 124 and to the kelly 110, which conveys the drilling fluid 122 downhole through the interior of the drill string 108 and through one or more orifices in the drill bit 114. As will be realized, the same pump, pipe and kelly can be used to circulate the loss control blend into drill string 108 for delivery to the formation where lost circulation is to be addressed.

During drilling, the drilling fluid 122 is then circulated back to the surface via an annulus 126 defined between the drill string 108 and the walls of the borehole 116. At the surface, the recirculated or spent drilling fluid 122 exits the annulus 126 and may be conveyed to one or more fluid processing unit(s) 128 via an interconnecting flow line 130. After passing through the fluid processing unit(s) 128, a "cleaned" drilling fluid 122 is deposited into a nearby retention pit 132 (i.e., a mud pit). While illustrated as being arranged at the outlet of the borehole 116 via the annulus 126, those skilled in the art will readily appreciate that the fluid processing unit(s) 128 may be arranged at any other location in the drilling assembly 100 to facilitate its proper function, without departing from the scope of the disclosure.

The retention pit 132 may be representative of one or more fluid storage facilities and/or units where not only the drilling fluid is stored but the loss control blend may be stored, reconditioned, and/or regulated until used. One or more of the components may be added to the blend via a mixing hopper 134 communicably coupled to or otherwise in fluid communication with the retention pit 132. The mixing hopper 134 may include, but is not limited to, mixers and related mixing equipment known to those skilled in the art. In other embodiments, however, the disclosed components may be added to the loss control blend at any other location in the drilling assembly 100. In at least one embodiment, for example, there could be more than one retention pit 132, such as multiple retention pits 132 in series.

Additionally, the methods described can be used to configure a loss control blend that can act as a primary sealant or barrier in the annulus with potentially reduced fall-back. For example, once a conventional cement is placed in the annulus, a portion of it may bleed off with time into the formation (either in static or dynamic condition), and therefore, reduce the desired "top of cement" in the annulus. This problem is exacerbated at higher densities (15+ ppg—that lead to higher hydrostatic pressures and therefore higher equivalent circulating pressures—that act against the fracture-pressure limits of the rock. Since high density blends that can be developed using this approach, which can battle lost circulation during drilling, the they can also be capable of controlling the leak off into the annulus in primary cementing applications when they are used as the primary settable barrier.

The above method, its steps and systems incorporating the method can be better understood by the following examples, which support and illustrate the process.

Example

An example of a method of the present disclosure was used to design a loss control blend, which was a slurry having 17 ppg. The blend was tested at 230° F.

Carrying out the method, a Portland cement was selected to which clay and polymer were added along with additional components selected in accordance with the method. The contribution of each of the components used in the system were used to effect the final attributes of the synergistic admixture. The composition was optimized to balance out the rheology suspenders to hold the suspended particles and at the same time to accommodate enough reactive settable materials like cement, silicalite and furnace slag to provide a final strong set composite. Iron oxide, ground marble, and silica flour (all having particle size of 1 μm to 100 μm) were added in proportions at a solids to water ratio that doesn't kill thixotropy created by the initial reactive materials but at the same time contributes positively to the final density of the slurry. Note, in a high temperature environment, silica flour contributes positively to final set strength though it acts like a passive material in gel state.

In accordance with the method, silicalite and the furnace slag are micronized (particle size of 0.1 μm to 100 μm) silica, lime and alumina rich materials that aid in rapid calcium-silicate-hydrate (CSH) and Ettringite gel formation. Their main function is to impart the gel formation and secondarily assist in compressive strength buildup. Retarders and Dispersants minimally affect these two materials owing to their high activity—but their low concentration ensures prevention of premature set.

Table 1 illustrates the components and the tailored attributes provided by the components as well as the suspension properties of the components.

TABLE 1

| Component | Specific Gravity | Contributes to Thixotropic Behavior | Contributes to Density | Contributes to Compressive Strength | Suspender |
|---|---|---|---|---|---|
| Blend Total | 2.97 | | | | |
| Portland Cement | 3.2 | No | Yes | Yes | Yes |
| Amorphous Silica | 2.3 | Yes | No | Yes | Yes |
| Furnace Slag | 2.9 | Yes | Yes | Yes | Yes |
| Iron Oxide | 4.9 | Yes | Yes | No | No |
| Ground Marble | 2.5 | Yes | Yes | No | No |

TABLE 1-continued

| Component | Specific Gravity | Contributes to Thixotropic Behavior | Contributes to Density | Contributes to Compressive Strength | Suspender |
|---|---|---|---|---|---|
| Silica Flour | 2.6 | No | Yes | Yes | No |
| Polysaccharide | 1.6 | Yes | No | No | Yes |
| Clay | 2.5 | Yes | No | No | Yes |
| Retarder | 1.6 | No | No | No | No |
| Polymer | 1.5 | No | No | No | No |

As can be seen the above components were selected so as to positively contribute to thixotropic behavior, density and compressive strength. The components were introduced in amounts as shown in Table 2, which also indicates the nature (active vs. passive) of the components.

TABLE 2

| | | | SG | w/w % | v/v % | | |
|---|---|---|---|---|---|---|---|
| 17 ppg* Example | Active Components | Cement | 3.18 | 18.2% | 16.5% | v/v % | w/w % |
| | | Amorphous Silica | 2.3 | 6.7% | 8.4% | 32% | 32% |
| | | Slag | 2.9 | 7.1% | 7.1% | | |
| | Passive Components | Iron Oxide | 5.2 | 21.9% | 12.2% | | |
| | | Marble | 2.4 | 34.5% | 41.6% | 65% | 66% |
| | | Silica Flour | 2.6 | 9.9% | 11.0% | | |
| | Other | Polysacc | 1.6 | 0.1% | 0.2% | | |
| | | Clay | 2.5 | 0.2% | 0.2% | 3.2% | 1.8% |
| | | Retarder | 1.6 | 1.0% | 1.8% | | |
| | | Polymer | 1.5 | 0.5% | 0.9% | | |
| | | | | 100.0% | 100.0% | | |

*"ppg" is pounds per gallon.

Further, the amount of water for the slurry as well as the component percentage make up for the resultant slurry are indicated in Table 3.

TABLE 3

| | SG | w/w % | v/v % |
|---|---|---|---|
| 17 ppg Blend | 2.89 | 78.0% | 55% |
| Water | 1.00 | 22.0% | 45% |
| Slurry | 2.04 | 100.0% | 100.0% |
| Slurry Density (ppg) | 17.02 | | |
| Water/Blend Ratio | | 0.282 | 0.817 |
| Blend (w/w %) | 78.0% | water/blend w % ratio | 0.28 |
| Active (w/w %) | 24.9% | water/active w % ratio | 0.88 |
| Passive (w/w %) | 50.6% | water/passive w % ratio | 0.44 |
| Water (w/w %) | 22.0% | | |

The retarder added was SCR-100™ retarder marketed by Halliburton Energy Services, Inc. The polymer was added as a fluid loss control additive and was Halad®-413 fluid loss additive marketed by Halliburton Energy Services, Inc.

The rheological behavior and gel strength of the designed loss control blend is given in Table 4.

TABLE 4

| RPM | 3 | 6 | 30 | 60 | 100 | 200 | 300 | 10 sec-80° F | 45 |
|---|---|---|---|---|---|---|---|---|---|
| @80° F. | 25 | 52 | 90 | 135 | 190 | 290 | +300 | 10 min-80° F. | 155 |
| @185° F. | 30 | 60 | 110 | 140 | 180 | 265 | +300 | 10 sec-185° F. | 65 |
| | | 58 | 107 | 138 | 178 | 263 | | 10 Min-185° F. | 290 |

Results for thickening time, Ultrasonic Cement Analyzer (UCA) compressive strength development and gel strength development on MACS-II are given in Table 5. The placement time for the blend in MACS was 1:30 min.

TABLE 5

| | UCA Compressive Strength (230° F. and 3000 psi) | | | |
|---|---|---|---|---|
| Time at ° F. and psi (hr:min) | 50 psi (hr:min) | 500 psi (hr:min) | 22 hr Strength (psi) | Transition time at 230° F. and 3000 psi (Time for 100 to 500 lbf/100 ft²) (minutes) |
| 9:00+ | 13:03 | 13:56 | 2500 | 13 |

Figure 2:
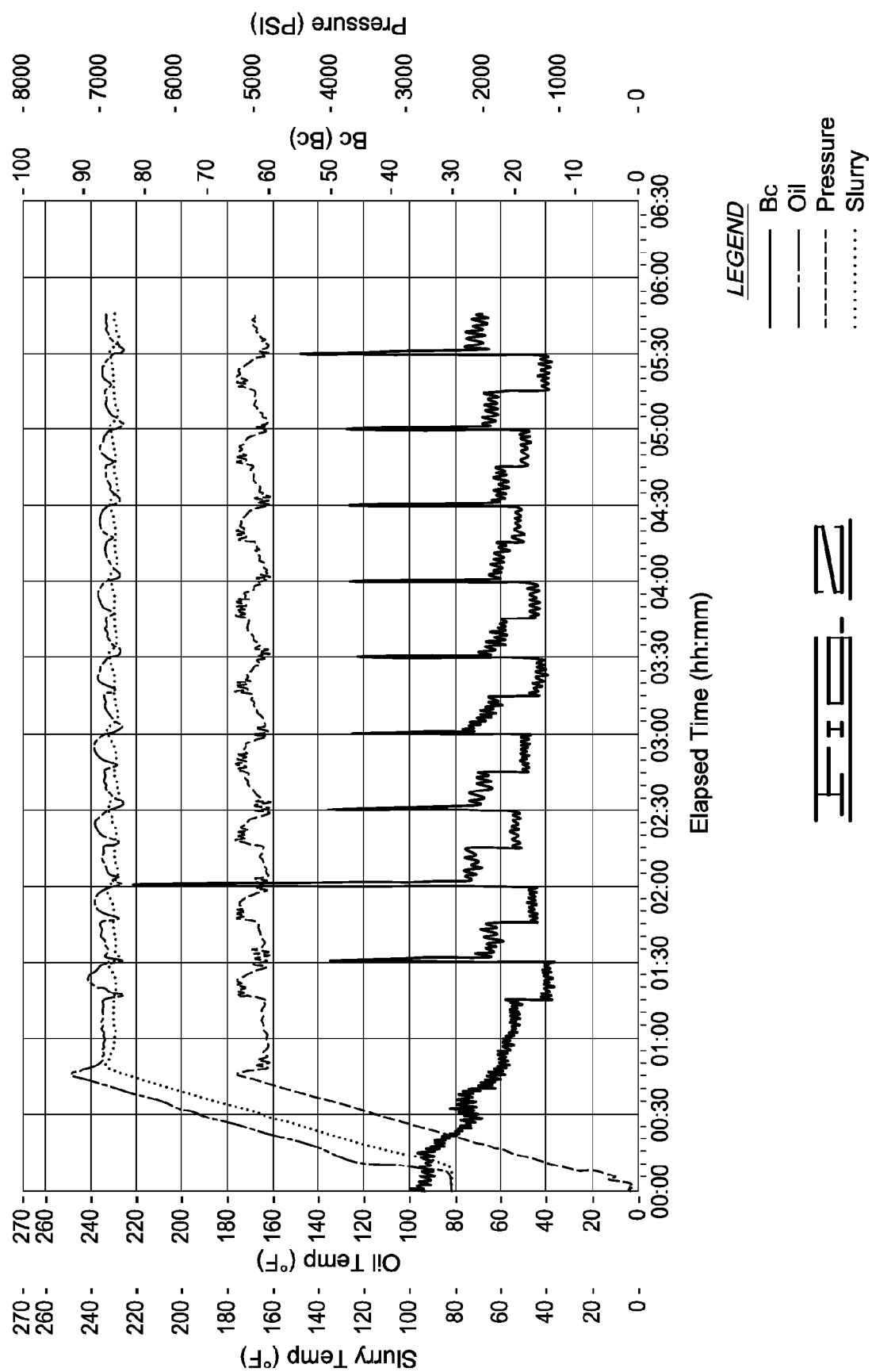
FIG. 2 is a graph illustrating slurry behavior during static and dynamic conditions for a slurry developed by a process according to this disclosure.
Figure 3:
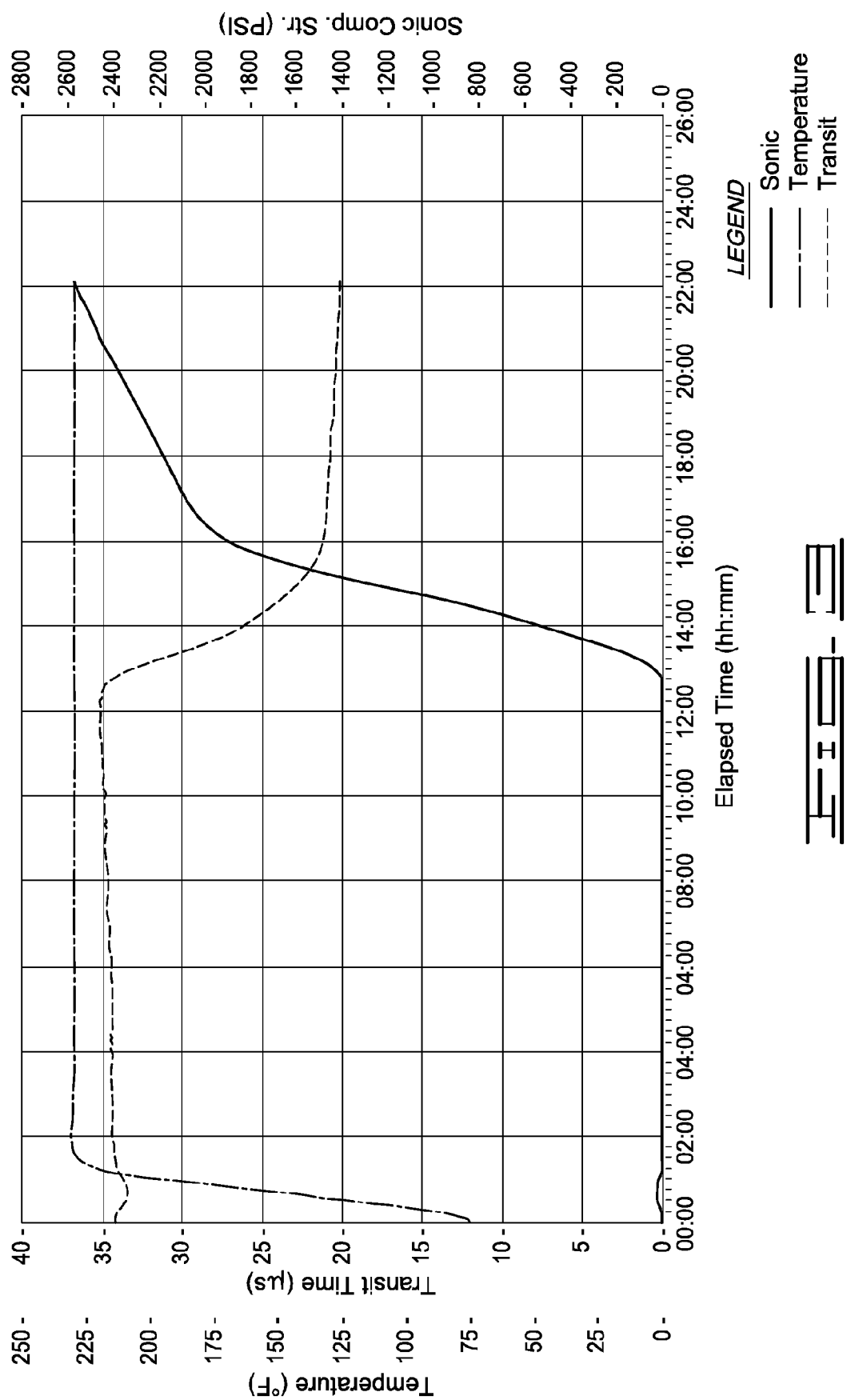
FIG. 3 is a graph illustrating compressive strength development over time for the slurry of FIG. 2
Figure 4:
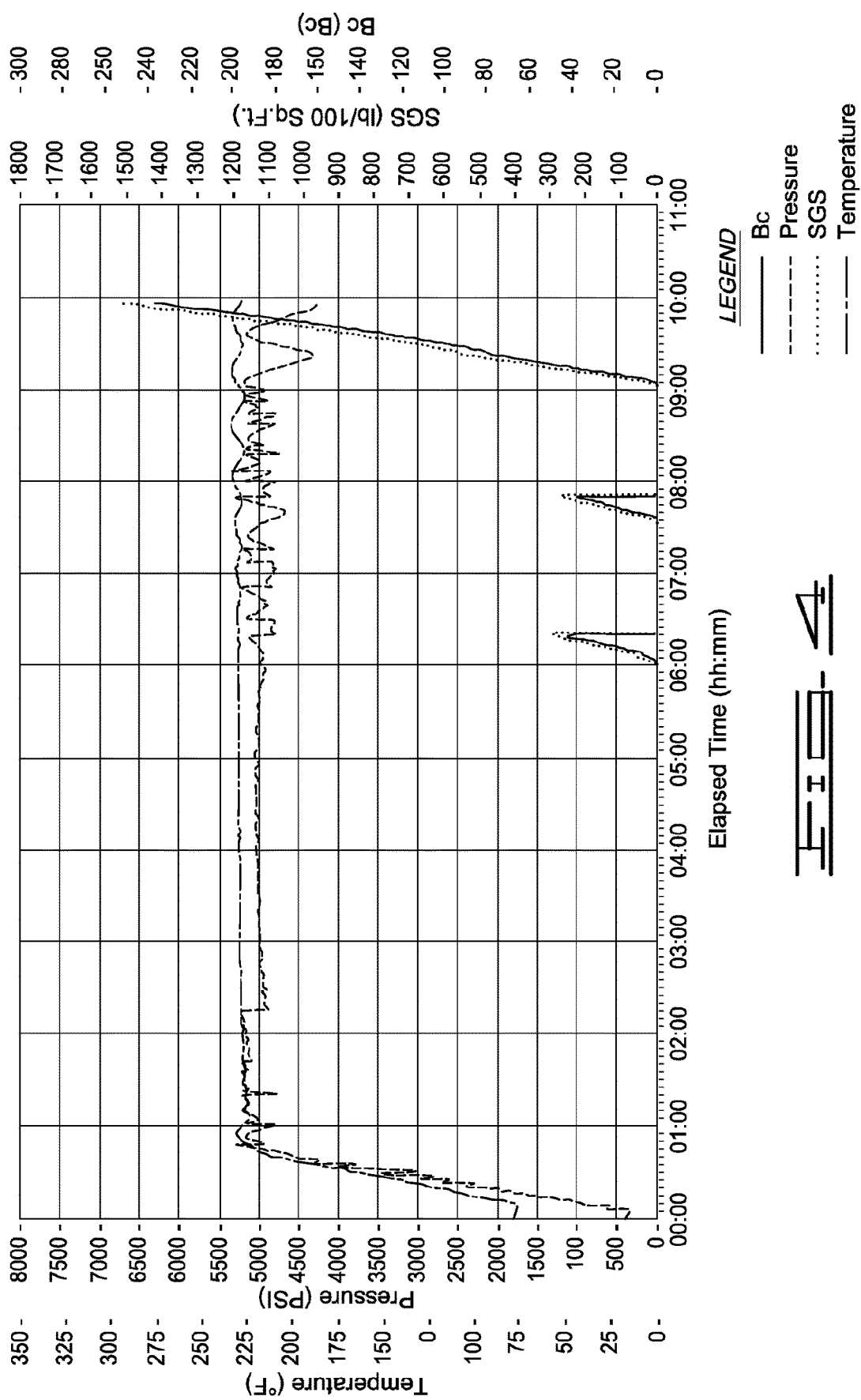
FIG. 4 is a graph illustrating gel strength development during static periods for the slurry of FIG. 2.

The thixotropic behavior and compressive strength of the slurry produced from the designed loss control blend was tested and the results are shown in FIGS. 2-4. In FIG. 2, the slurry behavior during static and dynamic condition was tested. Bc is a measure of slurry flowability index (Bearden Units of Consistency, which is a dimensionless quality for measuring viscosity based on pumpability or consistency of a slurry). The slurry was kept in dynamic condition for 1 hr 15 minutes and then, by switching off the motor, it was kept in static condition for 15 minutes. After that the motor was restarted and kept the slurry in dynamic condition for 15 min. This is the first On-Off-On cycle, then in subsequent cycles the slurry was kept stirring for 15 min and static for 15 minutes. The Bc value increases (spikes) when shear was applied after keeping the slurry in static condition which indicates build-up of gel strength during static condition. Then with continuous application of shear slurry comes back to a flowable condition. The experiment was performed on a high pressure, high temperature (HPHT) consistometer. As can be seen, the slurry using the designed loss control blend repeatedly came back to a flowable condition after the intervals of static conditions where the intervals are less than a predetermined time for setting of the composition.

FIG. 3 illustrates the compressive strength development in static conditions over time. The slurry formed from the designed loss control blend set into a hard mass after around 12 hours, and as can be seen, developed a high compressive strength after an interval of time that met and exceeded this predetermined time interval for setting.

FIG. 3 illustrates the rapid gel strength formation, which was monitored using a gel strength analyser. In FIG. 3, the slurry incorporating the designed loss control blend was stirred for 6 hours at 230° F. and 5000 psi. The slurry then was static for 20 minutes, after which stirring was continued for 1 hour and 10 minutes. The second stirring was followed by another 20 minute static period and another period of stirring from 1 hour and 10 minutes. After this third period of stirring, the slurry was static until the end of the test. As can be seen, the static period are all characterised by an increase in gel strength, with the final static period showing a continued increase in gel strength until the end of the test.

Accordingly, the current process produced a loss control blend that had enhanced thixotropic behavior over Portland cement and retained a comparable specific gravity and compressive strength.

The above disclosure is exemplified in a method of producing a loss control blend, the method comprising:
  determining a first density, a first compressive strength and a first thixotropic behavior of a first composition wherein the first composition consists essentially of (i) a first blend of first active components and (ii) water, wherein the first blend is present in the first composition in an amount from about 50 wt % to 95 wt %;
  selecting ingredients for the loss control blend so that the lost control blend comprises the first blend, a clay and/or a polymer and at least two additional components; and
  combining the thus selected ingredients to produce the loss control blend,
wherein the loss control blend produces a second composition when combined with water, and when the lost control blend is present in the second composition in amount about equal to the amount of the first blend in the first composition, the second composition having a second density, a second set compressive strength and a second thixotropic behavior, and wherein each additional component of the two or more additional components is selected to have at least one of three tailored attributes and at least one additional component is selected to have three of the tailored attributes, wherein the tailored attributes are: (i) including the additional component increases thixotropic behavior such that the second thixotropic behavior is greater than the first thixotropic behavior, (ii) including the additional component increases density such that the second density is greater than the first density, and (iii) including the additional component increases set compressive strength such that the second set compressive strength is greater than the first set compressive strength.

In the above embodiments, at least one of the additional components can include a plurality of passive materials consisting of solid particles, the plurality of passive materials selected so as to have:
  a particle size distribution for the plurality of passive materials and total surface area for the plurality of passive materials is sufficient for the passive materials to remain in suspension in the second composition without turbulence for a period of time sufficient to allow the second composition to set; and
  an aggregate specific gravity of the plurality of passive materials so as to maintain a solids to water ratio of at least 2 and so that the second composition does not have less thixotropic behavior than the first composition.

In the method, the first active components can include a hydraulic cement. Also, the at least one of the additional components can be an active component, which can include a material selected from cement kiln dust, lime kiln dust, hydrated lime, zeolites, pumice, perlite, furnace slag, fly ash, natural pozzolan, amorphous silica and combinations thereof.

Further, the clay can be present in an amount from 0.05 wt % to 5.0 wt % based on the total weight of the loss control blend, and the polymer can be present in an amount from 0.05 wt % to 3.0 wt % based on the total weight of the loss control blend. The clay is selected from the group consisting of hectorite, bentonite, sepiolite, kaolinite, montmorillonite, talc, vermiculite, halloysite, brucite, muscovite, smectite, chlorite and mixtures thereof. The polymer is selected from a group consisting of borate crosslinked HEC, xanthan gum, welan gum, guar gum, HPG, CMHPG, cellulose, CMC, HEC, Diutan, polyacrymide, AMPS, and combinations thereof.

In the embodiments of the method, the particle size distribution for the plurality of passive materials and total surface area for the plurality of passive materials can be sufficient for the passive materials to remain in suspension in the loss control blend without turbulence shearing at a temperature between 32° F. and 450° F. for a period of time sufficient to allow the loss control blend to set. Further, the particle size distribution of the plurality of passive materials can be such that the size of the particles is from 1 μm to 100 μm.

In some embodiments, the plurality of passive materials include passive materials selected from the group consisting of $CaCo_3$, $CaMg(Co_3)_2$, $MnO_2$, $Fe_2O_3$, $SiO_2$, $BaSO_4$, and combinations thereof and wherein the passive material is present in an amount from 10 wt % to 80 wt % based on the total weight of the loss control blend.

In some embodiments, at least one of the additional components include $SiO_2$ present in an amount in the range of 5 wt % to 40 wt % based on the total weight of the loss control blend, which serves as a coalescing material and is in the form of at least one of amorphous silica and crystalline silica.

In some embodiments, the aggregate specific gravity of the plurality of passive materials is between 2.5 and 5.0.

In some embodiments, the second density is greater than 15 ppg.

Generally, the loss control blend is configured for the conditions in a wellbore and is used in servicing the wellbore.

Therefore, the present compositions and methods are well adapted to attain the ends and advantages mentioned, as well as those that are inherent therein. The particular examples disclosed above are illustrative only, as the present treatment additives and methods may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative examples disclosed above may be altered or modified, and all such variations are considered within the scope and spirit of the present treatment additives and methods. While compositions and methods are described in terms of "comprising," "containing," "having," or "including" various components or steps, the compositions and methods can also, in some examples, "consist essentially of" or "consist of" the various components and steps. Whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee.

What is claimed is:

1. A method of producing a loss control blend, the method comprising:
    determining a first density, a first compressive strength and a first thixotropic behavior of a first composition, wherein the first composition consists essentially of (i) a first blend of first active components and (ii) water, wherein the first blend is present in the first composition in an amount from about 50 wt % to 95 wt %;
    selecting ingredients for the loss control blend so that the loss control blend comprises the first blend, a clay and/or a polymer and at least two additional components; and
    combining the thus selected ingredients to produce the loss control blend,
        wherein the loss control blend produces a second composition when combined with water, and when the lost control blend is present in the second composition in amount about equal to the amount of the first blend in the first composition, the second composition having a second density, a second set compressive strength and a second thixotropic behavior, and
        wherein each additional component is selected to have at least one of three tailored attributes and at least one additional component is selected to have three of the tailored attributes, wherein the tailored attributes are:
            (i) including the additional component increases thixotropic behavior such that the second thixotropic behavior is greater than the first thixotropic behavior,
            (ii) including the additional component increases density such that the second density is greater than the first density, and
            (iii) including the additional component increases set compressive strength such that the second set compressive strength is greater than the first set compressive strength.

2. The method of claim 1, wherein at least one of the additional components is an active component.

3. The method of claim 1, wherein the clay is present in an amount from 0.05 wt % to 5.0 wt % based on the total weight of the loss control blend, and the polymer is present in an amount from 0.05 wt % to 3.0 wt % based on the total weight of the loss control blend.

4. The method of claim 3, wherein the clay is selected from the group consisting of hectorite, bentonite, sepiolite, kaolinite, montmorillonite, talc, vermiculite, halloysite, brucite, muscovite, smectite, chlorite and mixtures thereof, and the polymer is selected from a group consisting of borate crosslinked HEC, xanthan gum, welan gum, guar gum, HPG, CMHPG, cellulose, CMC, HEC, Diutan, polyacrymide, AMPS, and combinations thereof.

5. The method of claim 1, wherein at least one of additional components includes a plurality of passive materials consisting of solid particles, the plurality of passive materials selected so as to have:
    a particle size distribution for the plurality of passive materials and total surface area for the plurality of passive materials is sufficient for the passive materials to remain in suspension in the second composition without turbulence for a period of time sufficient to allow the second composition to set; and
    an aggregate specific gravity of the plurality of passive material so as to maintain a solids to water ratio of at least 2 and so that the second composition does not have less thixotropic behavior than the first composition.

6. The method of claim 5, wherein a particle size distribution for the plurality of passive materials and total surface area for the plurality of passive materials is sufficient for the passive materials to remain in suspension in the loss control blend without shearing at a temperature between 32° F. and 450° F. for a period of time sufficient to allow the loss control blend to set.

7. The method of claim 5, wherein the particle size distribution of the plurality of passive materials is such that the size of the particles is from 1 μm to 100 μm.

8. The method of claim 7, wherein the plurality of passive materials include passive materials selected from the group consisting of $CaCo_3$, $CaMg(Co_3)_2$, $MnO_2$, $Fe_2O_3$, $SiO_2$, $BaSO_4$, and combinations thereof and wherein the passive materials are present in an amount from 10 wt % to 80 wt % based on the total weight of the loss control blend.

9. The method of claim 8, wherein at least one of the additional components includes $SiO_2$ present in an amount in the range of 5 wt % to 40 wt % based on the total weight of the loss control blend, which serves as a coalescing material and is in the form of at least one of amorphous silica and crystalline silica.

10. The method of claim 5, wherein the aggregate specific gravity of the plurality of passive materials is between 2.5 and 5.0.

11. The method of claim 1, wherein the second density is greater than 15 ppg.

12. The method of claim 1, wherein the loss control blend is configured for the conditions in a wellbore and is used in servicing the wellbore.

13. The method of claim 12, wherein the second density is greater than 15 PPg.

14. The method of claim 13, wherein the two or more components include one or more second active components, wherein the clay is selected from the group consisting of hectorite, bentonite, sepiolite, kaolinite, montmorillonite, talc, vermiculite, halloysite, brucite, muscovite, smectite, chlorite and mixtures thereof and is present in an amount from 0.05 wt % to 5.0 wt % based on the total weight of the loss control blend.

15. The method of claim 14, wherein the polymer is selected from the group consisting of borate crosslinked HEC, xanthan gum, welan gum, guar gum, HPG, CMHPG, cellulose, CMC, HEC, Diutan, polyacrymide, AMPS, and combination thereof and is present in an amount from 0.05 wt % to 3.0 wt % based on the total weight of the loss control blend.

16. A method of producing a loss control blend, the method comprising:
    determining a first density, a first compressive strength and a first thixotropic behavior of a first composition, wherein the first composition consists essentially of (i) a first blend of first active components and (ii) water, wherein the first blend is present in the first composition in an amount from about 50 wt % to 95 wt %;

selecting ingredients for the loss control blend so that the loss control blend comprises the first blend, a clay and/or a polymer and at least two additional components; and combining the thus selected ingredients to produce the loss control blend, wherein the loss control blend produces a second composition when combined with water, and when the lost control blend is present in the second composition in amount about equal to the amount of the first blend in the first composition, the second composition having a second density, a second set compressive strength and a second thixotropic behavior, and wherein each additional component is selected to have at least one of three tailored attributes and at least one additional component is selected to have three of the tailored attributes, wherein the tailored attributes are:

(i) including the additional component increases thixotropic behavior such that the second thixotropic behavior is greater than the first thixotropic behavior, (ii) including the additional component increases density such that the second density is greater than the first density, and (iii) including the additional component increases set compressive strength such that the second set compressive strength is greater than the first set compressive strength; and wherein at least one of the additional components include a plurality of passive materials consisting of solid particles, the plurality of passive materials selected so as to have:

a particle size distribution for the plurality of passive materials and total surface area for the plurality of passive materials is sufficient for the weighting agents to remain in suspension in the loss control blend without turbulence at a temperature between 32° F. and 450° F. for a period of time sufficient to allow the loss control blend to set;

an aggregate specific gravity of the plurality of passive material so as to maintain a solids to water ratio of at least 2 and so that the second composition does not have less thixotropic behavior than the first composition; and the particle size distribution of the plurality of passive material is such that the particles have a diameter within the range of from 1 µm to 100 µm.

17. The method of claim 16, wherein the plurality of passive material includes a passive material selected from the group consisting of $CaCo_3$, $MnO_2$, $Fe_2O_3$, $SiO_2$, $BaSO_4$, and combinations thereof and wherein the passive material is present in an amount from 10 wt % to 80 wt % based on the total weight of the loss control blend, and wherein the second active component includes a material selected from cement kiln dust, lime kiln dust, hydrated lime, zeolites, pumice, perlite, furnace slag, fly ash, natural pozzolan, amorphous silica and combinations thereof.

18. The method of claim 17, wherein the at least two or more components include $SiO_2$ present in an amount in the range of 5 wt % to 40 wt % based on the total weight of the loss control blend, which serves as a coalescing material and is in the form of at least one of amorphous silica and crystalline silica.

19. The method of claim 18, wherein the aggregate specific gravity of the plurality of passive material is between 2.5 and 5.0.

20. The method of claim 19, wherein the loss control blend is introduced downhole by a pump system.

* * * * *